H. O. RUGH.
SIGNALING SYSTEM.
APPLICATION FILED JUNE 26, 1908.
927,602.
Patented July 13, 1909.
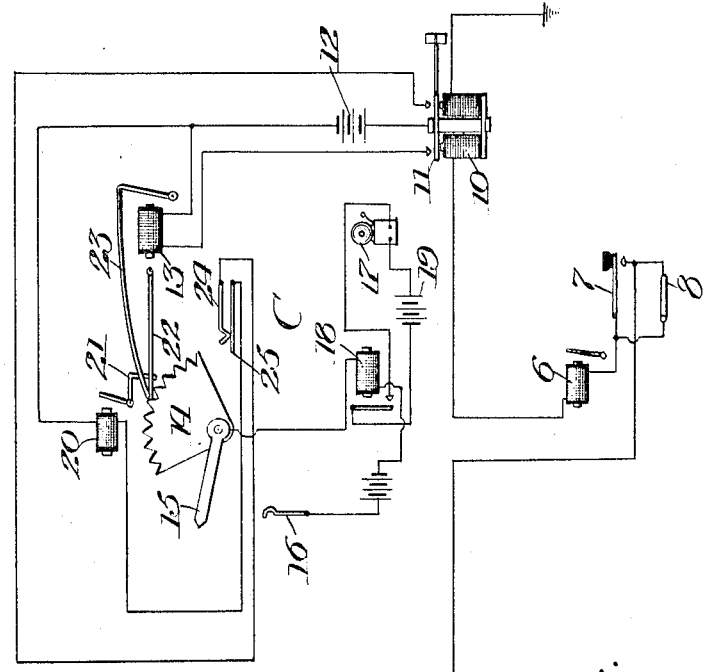
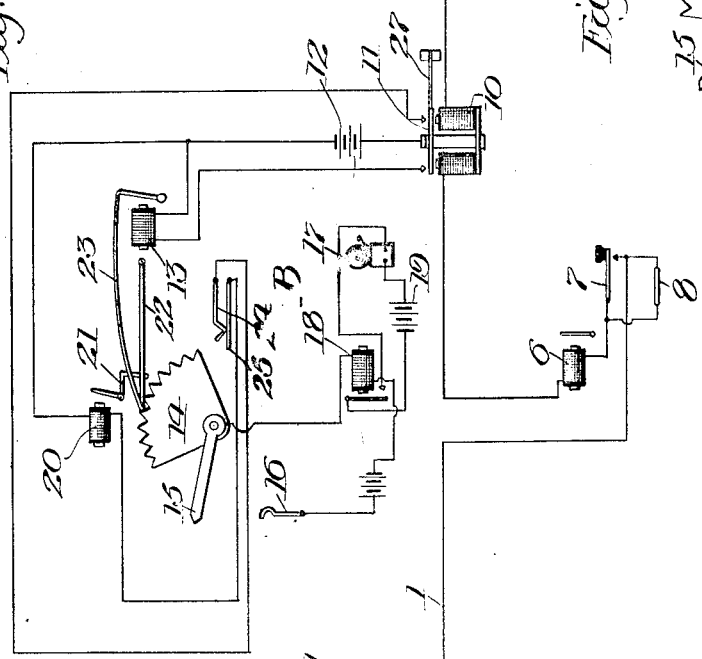
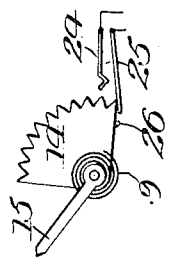
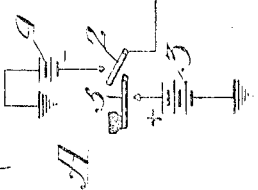
Inventor
Harry O. Rugh

UNITED STATES PATENT OFFICE.

HARRY O. RUGH, OF SANDWICH, ILLINOIS, ASSIGNOR TO SANDWICH ELECTRIC COMPANY, OF SANDWICH, ILLINOIS, A CORPORATION OF ILLINOIS.

SIGNALING SYSTEM.

No. 927,602.   Specification of Letters Patent.   Patented July 13, 1909.

Application filed June 26, 1908. Serial No. 440,570.

*To all whom it may concern:*

Be it known that I, HARRY O. RUGH, citizen of the United States, residing at Sandwich, in the county of Dekalb and State of Illinois, have invented a certain new and useful Improvement in Signaling Systems, of which the following is a full, clear, concise, and exact description, reference being had to the accompanying drawings, forming a part of this specification.

My invention relates to signaling systems, and has for its object the provision of an improved selector system which is applicable more particularly in the operation of railway telegraph and signaling circuits.

The advantages of my invention will be more particularly set forth in connection with the embodiment thereof shown in the accompanying drawing, in connection with which I will now describe my invention.

Figure 1 shows my system diagrammatically, and Fig. 2 shows a detail of the selector mechanism. I have for the purposes of illustration shown three stations A, B, and C, A being the sending station for one of the systems, and B and C the receiving stations. A line wire 1 unites all of the stations, ending at station A in a switch 2, adapted for connecting said line wire 1 with either of the batteries 3 or 4, so that either positive or negative battery impulses may be projected over said line wire 1 to ground. The other end of said line wire 1 is likewise grounded. A key 5 is provided to send positive battery impulses over the line wire 1 when the switch 2 is in its proper position, the normal position of switch 2 being to connect the line wire 1 to negative battery 4. A telegraph relay 6 is connected with its associate key 7, and the short circuit key 8 is inserted in the line wire 1 at the various stations B, C, whose number may be increased, of course, if desired. The switch 2 is normally in such position that for telegraphic purposes negative battery current is permanently connected to the left hand end of line wire 1. When key 5 is depressed, however, positive battery impulses can be sent over line wire 1, as clearly indicated. This key 5 is used for calling the various stations B and C independently of the telegraph instruments, and calling of these stations B and C is accomplished by sending positive battery impulses over said line wire 1, which positive impulses pass through a relay 10 and which actuates its floating armature 11 in such a way as to send impulses from the battery 12 through the relay 13, which relay, therefore, actuates the step-by-step mechanism 14 until it is in such a position that the arm 15 makes contact with the spring 16, thus to ring the bell 17 through the agency of the time relay 18 and battery 19. The arm 15, of course, is placed depending upon the particular station which it is desired to call, having different angular positions, so that various positions of the step-by-step mechanism will call the various stations selected.

The action of the time relay 18 prevents a mere passing contact of the arm 15 with the spring 16 in actuating the bell 17. Thus each of the stations B and C may be called from the station A by depressing the key 5. After the bell has sounded, of the particular station desired, switch 2 is released and negative battery current again flows through line wire 1. This actuates the polarized relay 10 in the opposite direction, so that current flows from battery 12, through the relay 20, so that by means of the arm 21 the actuating levers 22 and 23 are released to allow the step-by-step mechanism 14 to fall back into its normal position. When it thus falls back into its normal position, it thereby opens the circuit through springs 24, 25, as shown in Fig. 2, thereby opening the circuit through the relay 20. It is very important when the step-by-step mechanism falls back into its normal position, to prevent a continuous actuation of the armature 21, on account of the negative battery impulses which would be flowing over the line whenever the telegraph key 7 of either station is actuated. The relay 20 and its armature 21 thus constitute what might be called restorer controlling means. The release magnet 20 being cut out, however, through the agency of the step-by-step mechanism 14, and the springs 24 and 25, battery impulses may be sent over line wire 1, through the key 7, and not cause any action of the relay 20, even if the polarized relay 10 responds to these negative impulses. A coiled spring 9 restores the selector mechanism 14 to its normal position, when the magnet 20 operates. A stop 26 is provided, so that the selector mechanism 14 will stop after it has opened circuit through springs 24 and 25. If the circuit were not opened through springs 24 and 25, it is apparent that an actuation of the telegraph key 7 in sending negative battery impulses over the line, would continually operate the magnet 20 through operation of the polarized relay 10. This operation is naturally very undesirable, and my improved means above described overcome this difficulty to the practical operation of telegraph systems on a line such as outlined above. A spring 27 maintains the armature 11 in a floating position, so that it responds to either positive or negative impulses.

While I have herein shown and particularly described one embodiment of my invention, I do not wish to limit myself to the precise construction and arrangement as herein shown, but

What I claim as new and desire to secure by Letters Patent is:

1. A signaling system comprising a line circuit having a central station and a plurality of substations, telegraphic instruments interposed at intervals along said circuit, polarized relays at sub-stations distributed along said circuit, a selector mechanism for each polarized relay, a signal under the control of the selector mechanism, restorer controlling means operable from the central station permitting operation of the selector mechanism to normal after operation, and means associated with the selector mechanism when in its normal position for rendering inoperative the selector restorer controlling means.

2. A signaling system comprising a line circuit having a central station and a plurality of sub-stations, telegraphic instruments interposed at intervals along said circuit, polarized relays at sub-stations distributed along said circuit, a selector mechanism for each polarized relay, a signal under the control of the selector mechanism, electromagnetic restorer controlling means operable from the central station permitting restoration of the selector mechanism to normal after operation, and means associated with the selector mechanism when in its normal position for rendering inoperative the selector restorer controlling means.

3. A signaling system comprising a line circuit having a central station and a plurality of substations, telegraph instruments interposed at intervals along said circuit, relays at substations distributed along said circuit, a selector mechanism for each relay, a signal under the control of the selector mechanism, a restorer controlling means operable from the central station permitting operation of the selector mechanism to normal after operation, and means associated with the selector mechanism when in its normal position for rendering inoperative the selector restorer controlling means.

4. A signaling system comprising a line circuit having a central station and a plurality of substations, telegraphic instruments interposed at intervals along said circuit operated with one character of current, polarized relays at substations distributed along said circuit for signal calling operation with a different character of current, a selector mechanism for each polarized relay, a signal under control of the selector mechanism, restorer controlling means adapted for operation through the agency of said polarized relay by the first-mentioned character of current for restoring the selector mechanism to normal after operation, and switching means associated with the selector mechanism when in its normal position for rendering inoperative the selector restorer controlling means.

In witness whereof, I hereunto subscribe my name this eighth day of June A. D., 1908.

HARRY O. RUGH.

Witnesses:
E. B. CAMPBELL,
O. M. WERMIEL.